United States Patent

Clark et al.

[11] Patent Number: 6,085,816
[45] Date of Patent: Jul. 11, 2000

[54] TIRE CHAIN FOR DUAL WHEEL TIRES

[75] Inventors: Larry C. Clark, Amity; David S. Jardin, Mulino, both of Oreg.

[73] Assignee: Burns Bros., Inc., Portland, Oreg.

[21] Appl. No.: 09/143,396

[22] Filed: Aug. 28, 1998

Related U.S. Application Data

[60] Provisional application No. 60/062,450, Oct. 20, 1997.

[51] Int. Cl.[7] .................................................. B60C 27/10
[52] U.S. Cl. ........................................ 152/220; 152/219
[58] Field of Search .................................... 152/173, 185, 152/213 R, 217, 219, 220, 241

[56] References Cited

U.S. PATENT DOCUMENTS

| | | |
|---|---|---|
| 979,008 | 12/1910 | Kennedy . |
| 1,016,846 | 2/1912 | Myers . |
| 1,049,734 | 1/1913 | Knoth . |
| 1,131,116 | 3/1915 | Chubbuck . |
| 1,253,113 | 1/1918 | Weed . |
| 1,848,444 | 12/1930 | Tully . |
| 2,222,786 | 6/1938 | Snyder ................................... 152/220 |
| 3,696,852 | 10/1972 | Oulman ................................. 152/220 |
| 3,752,204 | 8/1973 | Ouellette ............................... 152/219 |
| 4,111,251 | 9/1978 | Bula ...................................... 152/219 |
| 4,366,850 | 1/1983 | Coutts ................................... 152/222 |
| 5,056,574 | 10/1991 | Maresh et al. ....................... 152/241 |

FOREIGN PATENT DOCUMENTS

| | | | |
|---|---|---|---|
| 552651 | 6/1932 | Germany ............................. 152/220 |
| 911462 | 4/1954 | Germany ............................. 152/220 |
| 64-34305 | 3/1989 | Japan . |
| 3-23369 | 3/1991 | Japan . |
| 105626 | 10/1924 | Switzerland ......................... 152/220 |

*Primary Examiner*—Russell D. Stormer
*Attorney, Agent, or Firm*—Vorys, Sater, Seymour & Pease LLP

[57] ABSTRACT

A cable-type tire chain for the tires of dual wheels comprises a pair of side members and a plurality of cross members extending between and connected to the side members and supporting traction elements. The tire chain includes a center member that extends circumferentially over the cross members of the installed tire chain and that draws center portions of the cross members into the space between the tires. The center member comprises a core surrounded by a helical spring. The core includes a cable wrapped helically with wire, and the inner diameter of the spring is greater than the outer diameter of the core so that the spring can move on the core.

23 Claims, 6 Drawing Sheets

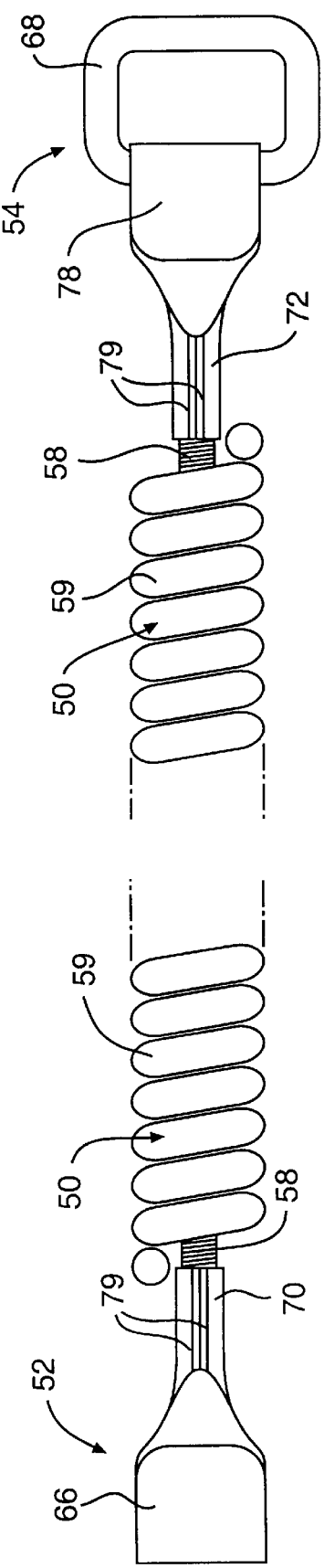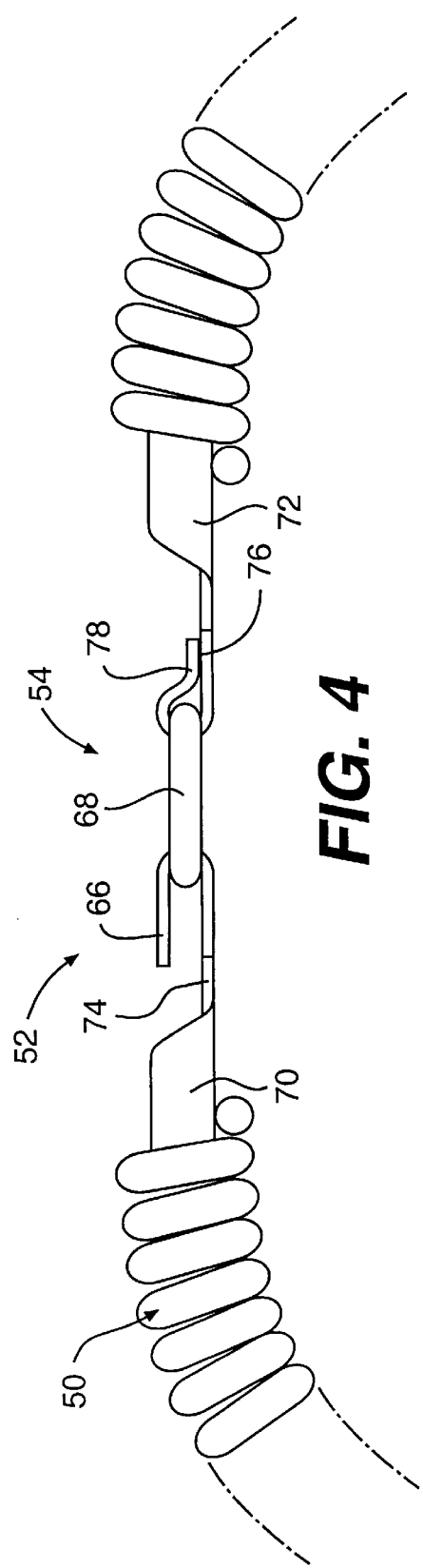

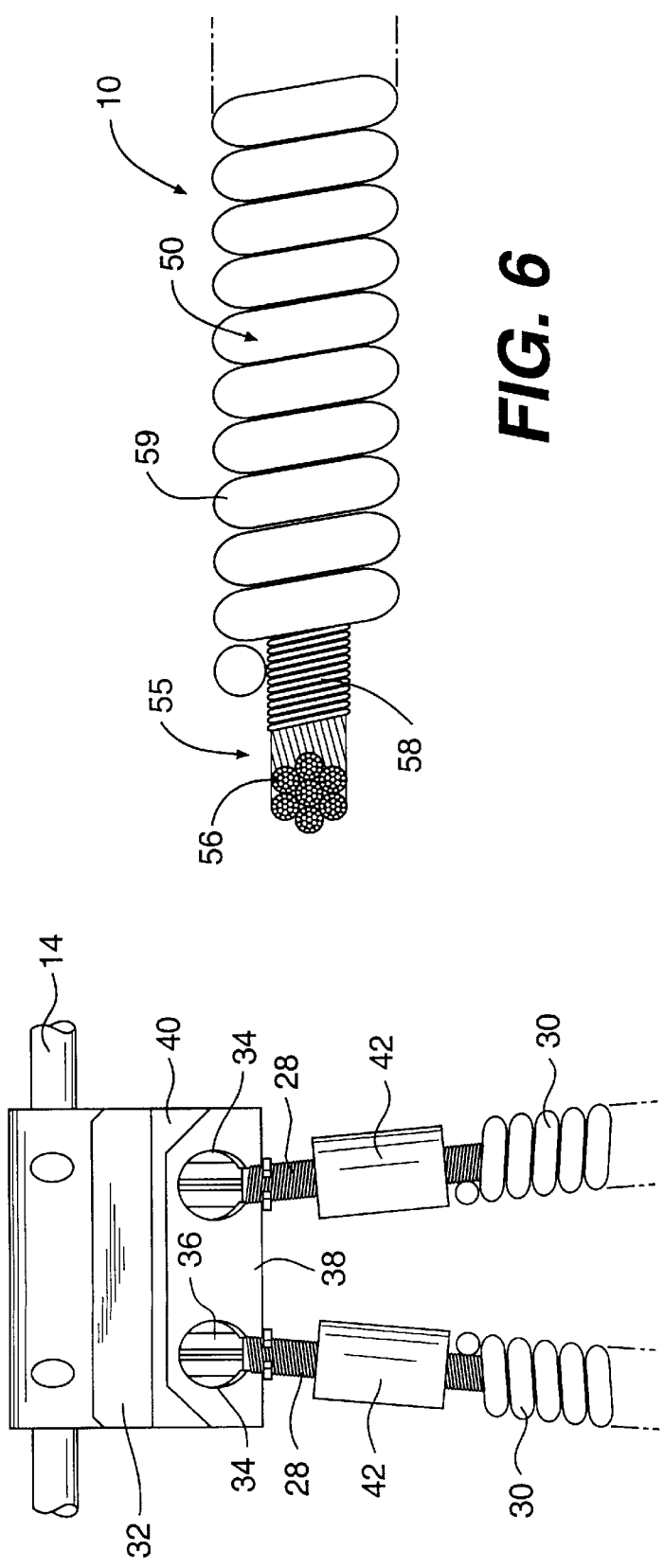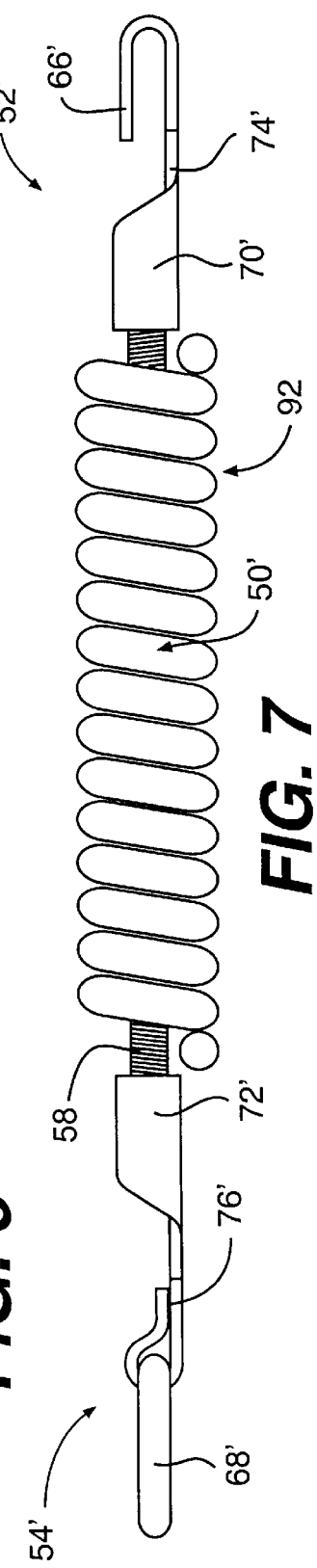

TIRE CHAIN FOR DUAL WHEEL TIRES

CROSS REFERENCE TO RELATED APPLICATION

This application claims the benefit of provisional application Ser. No. 60/062,450 filed Oct. 20, 1997.

BACKGROUND OF THE INVENTION

This invention is concerned with tire chains for tires of dual wheels, more particularly, cable-type tire chains for dual wheels of trucks.

Cable-type tire chains, having a pair of elongated side members (one or both of which may comprise a cable) and a plurality of cross members (each including a cable supporting a series of traction sleeves), are well known. U.S. Pat. No. 5,056,574 granted Oct. 15, 1991 and assigned to Burns Bros. Inc., the assignee of the present invention, discloses and claims significantly improved cable-type tire chains in which the cross members form a uniform zig-zag pattern. When such tire chains are installed on the tires of dual wheels, with the cross members extending continuously across the treads of the tires of both wheels, substantial portions of the cross members are located over the space between the tires, causing problems that are not present when such tire chains are installed on tires of single wheels. For example, increased cross member throw-out due to the unsupported length of the cross members, may cause cross members to strike vehicle parts, damaging the vehicle as well as the cross members. Increased throw-out causes increased cross member wear when the cross members strike the ground as the wheels rotate. Furthermore, the unrestrained center portions of cross members tend to cause non-uniformity of the cross member pattern, reducing traction, particularly during locked-wheel braking.

BRIEF DESCRIPTION OF THE INVENTION

As later set forth in detail, the solution to the foregoing problems involves the provision of an appropriate circumferential center member which draws the center portions of the cross members into the space between the dual tire treads, but the discovery of an appropriate center member, particularly for cable-type tire chains, was not a simple matter. Link chain center members employed previously with link-type tire chains on dual tire treads do not perform satisfactorily with cable-type tire chains, principally because of wear problems at the intersections of the center member and the cross members. Center members previously employed with traction plates on dual wheels are also inappropriate for cable-type tire chains.

The present invention provides highly effective cable-type tire chains for the tires of dual wheels, by employing a flexible, dimensionally stable center member comprising a core surrounded by a helical spring.

BRIEF DESCRIPTION OF THE DRAWINGS

The invention will be further described in conjunction with the accompanying drawings, which illustrate preferred and exemplary embodiments, and wherein:

FIGS. 2 and 3 are plan views of end portions of a center member, showing cooperable connector parts;

FIG. 4 is a side elevation view showing the connector parts engaged;

FIG. 5 is a fragmentary plan view showing a portion of the tire chain where cross members are connected to a side member;

FIG. 6 is a fragmentary enlarged sectional view showing details of the construction of the center member.

FIG. 7 is a side elevation view of an optional center member extender;

DETAILED DESCRIPTION OF THE INVENTION

Figure 1:
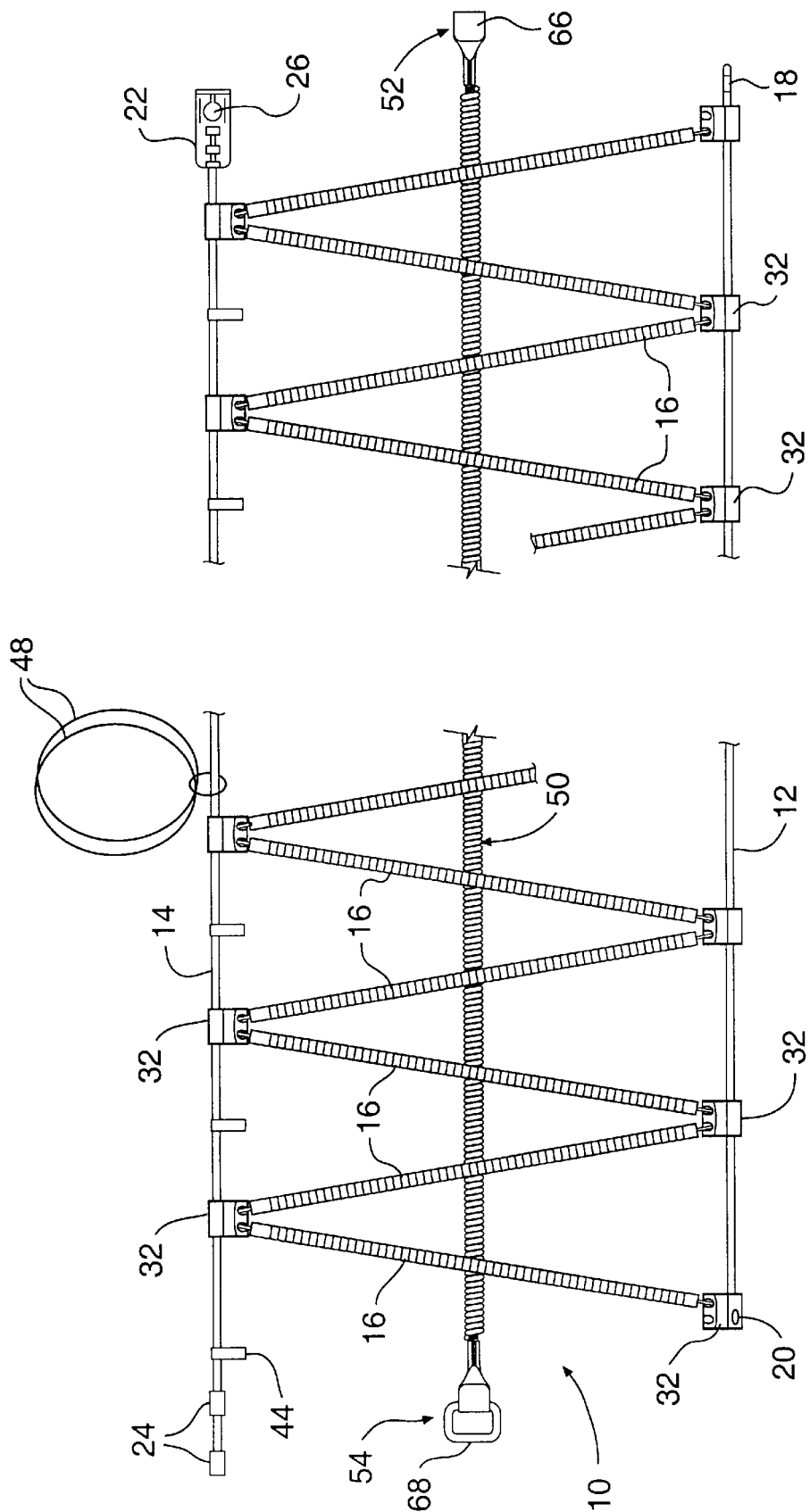
FIG. 1 is fragmentary plan view of a tire chain of a first embodiment of the invention.

As shown in FIG. 1, a tire chain 10 in a first embodiment of the invention comprises a pair of elongated side members 12, 14 and a plurality of cross members 16 extending between the side members and forming a uniform zig-zag pattern. Each side member has cooperable connector parts at opposite ends thereof by which the side member may be formed into a circular configuration. For example, side member 12, to be used as an inner side member, has a hook 18 at one end and a cooperable eye 20 at the opposite end, so that the side member may be formed into a circle of fixed circumferential length. Side member 14, to be used as an outer side member, has an angled plate 22 crimped to one end and a plurality of abutments 24 crimped to the other end, one or more of the abutments being inserted in a keyhole shaped opening 26 in the plate so that the side member may be formed into a circle of adjustable circumferential length (depending on the number of abutments inserted). Both side members may be formed of steel aircraft-type cable, but the inner side member may be a wire hoop. Each cross member 16 comprises a core of the same type of cable, preferably wrapped with steel plow wire 28, and supporting thereon a series of traction elements such as helical wire sleeves 30, through which the wrapped cable core extends somewhat loosely so that the sleeves may rotate on the core. See FIG. 5.

As shown in FIG. 5, corresponding ends of each pair of successive cross members are attached to the side members by connector plates 32 crimped fixedly to the side members and each having keyhole shaped openings 34 through which studded ends 36 of the cross member cables are inserted. Each plate has a tab 38, in which the openings are formed, and which is bent over to trap the studded ends of the cross members between the tab and the main body 40 of the plate. Each cross member has abutment sleeves 42 fixed thereon near its opposite ends and serving as stops to prevent the adjacent traction elements 30 from contacting the connector plates 32. The distance between the abutments at opposite ends of each cross member is preferably sufficient to permit some axial movement of the traction elements along the cross members.

The connector plates 32 of each side member are equally spaced along the length of the side member, and the connector plates of the outer side member 14 are interspersed with hooks 44, so that successive connector plates have a hook therebetween. The hooks are permanently attached to the side member by enveloping the side member with hook bushings 46 (see FIG. 8) but are supported somewhat loosely, so that the position of each hook may be adjusted between associated connector plates.

In FIG. 1 elastic tensioning hoops 48 (essentially large rubber bands) are shown attached (for shipment purposes) to the outer side member 14. As later described, the tensioning hoops are used in conjunction with the hooks 44 to apply tension to the cross members.

Further details of tire chains having the general construction described so far may be found in the aforesaid commonly owned U.S. Pat. 5,056,574 and in commonly owned U.S. Pat. No. 4,366,850 and U.S. Pat. No. 3,752,204 referred to in the specification of U.S. Pat. No. 5,056,574 (all incorporated herein by reference).

In accordance with the present invention, the tire chain 10 comprises an elongated center member 50. In FIG. 1, the center member is shown under the cross members 16 for convenience of illustration, but this is not the operative position of the member, as will become apparent later.

As shown in FIG. 6, the center member 10 comprises a core 55 formed of steel aircraft-type cable 56 wrapped with steel plow wire 58 surrounded by a helical wire spring 59, adjacent turns of which contact each other. The inner diameter of the spring 59 is slightly larger than the outer diameter of the core 55 so that the spring 59 is capable of movement on the core. The cable 56 is typically 0.125 o.d. lubricated aircraft cable comprising seven bundles each having 19 strands. The plow wire 58 is preferably 0.040 o.d. high carbon steel tightly wound on the stranded cable to form a sheath of 0.198 to 0.202 o.d. The spring 59 is typically formed of 0.090 plated spring wire and has an o.d. of 0.665 and an i.d. of 0.475. The material of spring 59 may vary and the dimensions of the spring may vary depending upon the size of the tires. For example, the spring may be formed of 0.120 alloy spring wire and have an o.d. of 0.720 and an i.d. of 0.535. All of the foregoing dimensions are expressed in inches. The core 55 of the center member must be dimensionally stable, i.e., it must not be easily stretched (resiliently or non-resiliently).

The center member is provided with cooperable connector parts 52,54 at its opposite ends. As shown in FIGS. 2–4, cooperable engaging elements of the connector parts 52, 54 comprise a hook 66 at one end and an eye 68 at the opposite end of the center member. Each connector part may comprise a plate formed of cold rolled steel (typically one tenth of an inch thick) having a portion formed into a cylindrical tube 70 or 72 through which the cable extends, and having a flat projection 74 or 76. In connector part 52 the projection 74 is bent to the shape of an open hook 66, and in connector part 54 the projection 76 is bent into the shape of a bushing 78 that embraces a leg of a metal ring forming the eye 68.

As shown in FIGS. 2 and 3, the tubular portion 70 or 72 of each connector part is not entirely continuous circumferentially, but has opposed longitudinal edges 79. The tubular portions 70 and 72 are tightly crimped onto the core 55 comprising the cable 56 and the plow wire 58. Typically, at least 1200 to 1400 psi is required to pull off the connector parts 52, 54 from the core 55.

Figure 8:
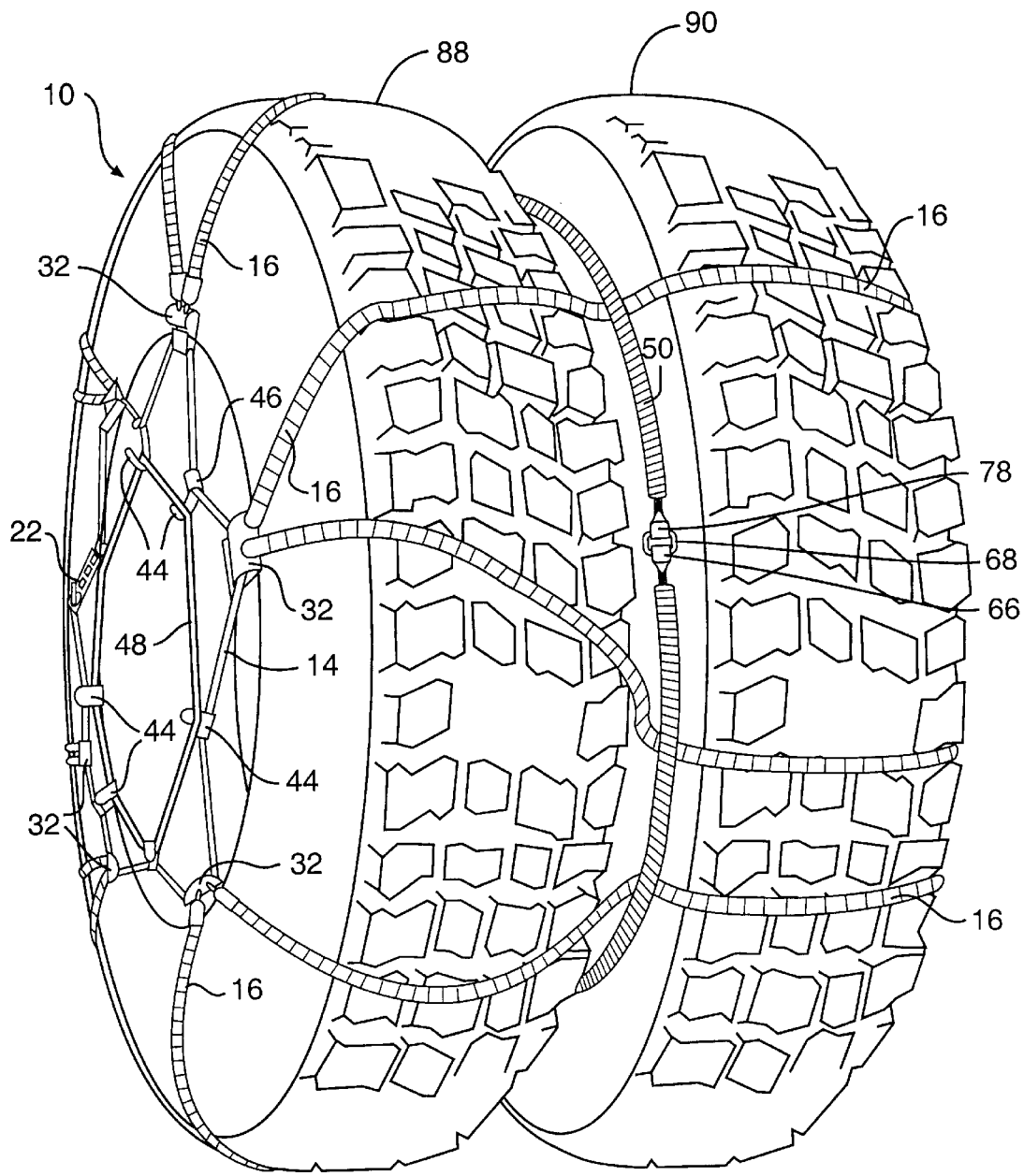
FIG. 8 is a perspective view showing the tire chain of the first embodiment installed on the tires of dual wheels.

In FIG. 8, the tire chain 10 of FIG. 1 is shown installed on the tires 88 and 90 of dual wheels. The installation procedure is simple. The tire chain is unpacked from its shipping box and is placed on the ground with the smooth side (without tab 38) of the cross member connector plates 32 directed toward the ground as shown in FIG. 1. The center member 50 is passed between the dual tires and placed on the ground. The tire chain (less the center member) is then draped over the dual tires equally, with the end fasteners 18, 20 and 22, 24 of the side members toward the ground. Side member 12 should be located at the inner side of the inner tire 90, and side member 14 should be located at the outer side of the outer tire 88. The smooth side of the connector plates 32 should be in contact with the tire side walls (i.e., the tabs 38 of the connector plates should face away from the side walls). The tensioning hooks 44 will be located at the outer side of the outer tire 88 with the smooth side of the hooks against the side wall.

The hook 18 at one end of the inner side member 12 is then connected to the eye 20 at the opposite end to form the inner side member into a circle. The ends of the center member 50 are then pulled upwardly so that the center member passes over the cross members. After ensuring that the center member 50 passes over all of the cross members, the ends of the center member are connected, by connector parts 66, 68, to form the center member roughly into a circle in the space between the tires, the plane of the circle being perpendicular to the axis of the dual wheels. The outer side member 14 is then formed into a circle by inserting the lugged end 24 into the hole 26 of the connector part 22 at the opposite end.

As indicated in FIG. 4, when the center member is formed into a circle, the spring 59 is flexed, so that adjacent turns of the spring move slightly apart at the larger circumference of the spring while maintaining turn-to-turn contact at the smaller circumference of the spring. This causes the spring to extend slightly, longitudinally, and the ends of the spring move longitudinally to cover the tubular portions 70 and 72. As shown in FIGS. 2 and 3, before the center member 50 is formed into a circle, the length of the spring is such that the tubular portions 70 and 72 extend beyond the ends of the spring 59.

To complete the installation, the elastic tensioners 48 are engaged with the tensioning hooks 44 to draw the tensioning hooks toward the dual wheel axis. Preferably two rubber tighteners are employed in parallel. Each tightener should be installed by stretching it from one hook to the hook farthest therefrom and then continuing this process between successive pairs of hooks.

The length of the center member is preferably approximately 5% less than the circumference of the dual tires. For example, if the diameter of the tires is approximately 40 inches, the length of the center member is typically 119 inches. When the installation is complete, the center member draws the center portions of the cross members 16 into the space between the dual tires.

The cooperative action of the elastic tensioners 48 and the center member 50 keeps the cross members properly tensioned over the treads of both of the dual tires. The center member preferably "floats", so that it may move circumferentially during operation of the vehicle. Such rotation of the center member, at a slow rate relative to tire rotation, prevents the center member from pulling on and contorting particular cross members, which would distort the desired uniform zig-zag pattern of the cross members on the dual tires. The "floating" center member reduces breakage of cross members where they come in contact with the center member. It is desirable that the portions of the cross members that intersect the center member not be stressed locally to high levels or bent sharply. The entire tire chain is preferably capable of moving circumferentially during operation of the vehicle, further reducing wear.

The center member makes no contact with the road surface during operation, so that minimal center member wear or abrasion occurs. The projecting metal portions of the connector parts at opposite ends of the center member are protected by not coming in contact with the road surface. Because the connector parts are light weight there is little likelihood of contact with the road surface due to centrifugal force.

The length of the center member may be extended, for example by providing an extender 92 such as that shown in FIG. 7. The extender is, in effect, a short length of center member 50' with connector parts 52', 54' at opposite ends thereof having tubes 70', 72' crimped on the core and having a hook 66' and an eye 68' extending from flat projections 74', 76' and engageable with cooperable connector parts 68, 66 at opposite ends of the main center member.

Figure 9:
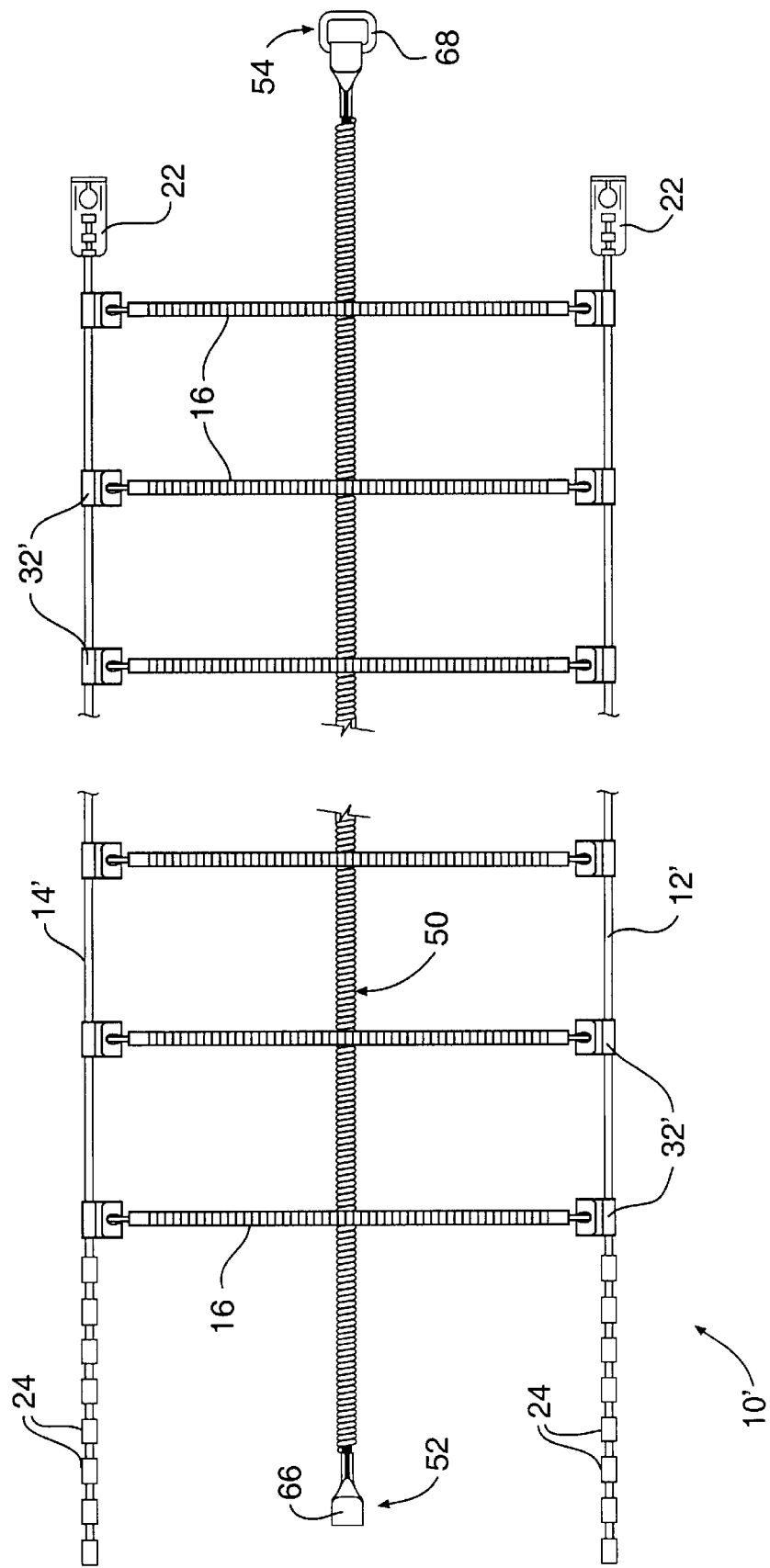
FIG. 9 is a fragmentary plan view of a second embodiment of the invention.
Figure 10:
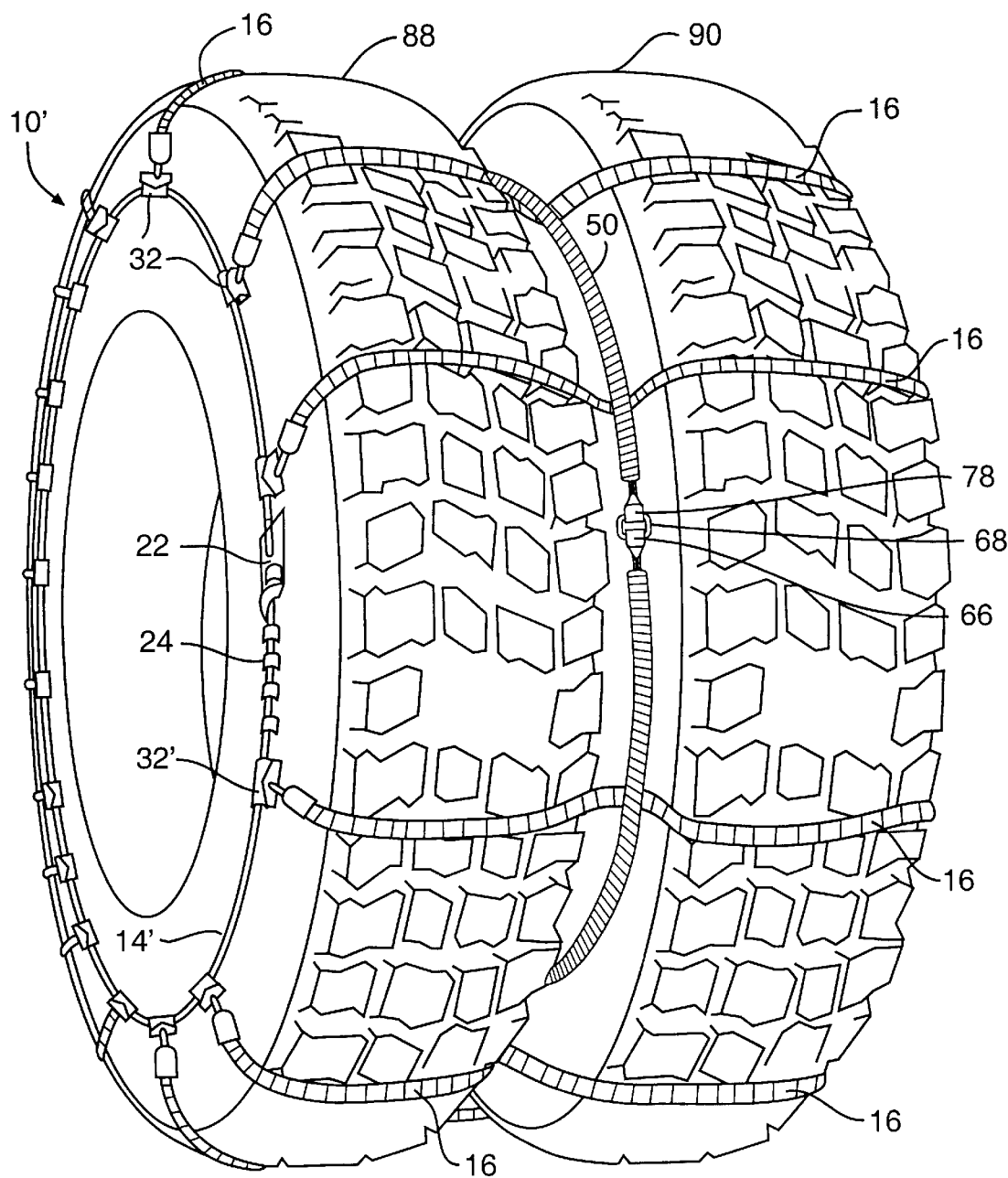
FIG. 10 is a perspective view showing the tire chain of the second embodiment installed on the tires of dual wheels.

FIGS. 9 and 10 illustrate a second embodiment of the invention, in which the invention is applied to a ladder type tire chain 10', comprising substantially parallel cross members 16 extending between side members 12' and 14'. Each cross member may be of the type described in conjunction with the first embodiment of the invention, but the connector plate 32' at each end of each cross member has only a single hole. Each side member may have connector parts 22, 24 at opposite ends thereof of the same type as the connector parts of outer side member 14 in FIG. 1. FIG. 10 shows the tire chain 10' installed on the tires 88 and 90 of dual wheels. In the embodiment of FIGS. 9 and 10, the tensioning hooks and elastic tensioning bands are not shown, but they may be provided.

While preferred embodiments of the inventions have been shown and described, these embodiments are not exclusive, and the principles of the invention may be applied in other embodiments which come within the scope of the appended claims. For example, while the embodiments shown and described are cable-type tire chains, center members of the type employed in the invention may be useful with other types of tire chains also.

What is claimed is:

1. A tire chain for dual tires, comprising a pair of spaced elongated side members, a plurality of cross members extending between and connected to said side members, connector parts at the ends of said side members for installing the tire chain with one of said side members extending circumferentially of one of said tires at one side thereof and with the other of said side members extending circumferentially of the other of said tires at an opposite side thereof and with said cross members extending across treads of said tires, and a flexible, dimensionally stable center member having cooperable connector parts at opposite ends thereof for installing the center member circumferentially in a space between said tires with the center member extending over said cross members and drawing center portions of said cross members into said space between said tires, wherein the center member comprises a core and a helical spring surrounding the core.

2. A tire chain according to claim 1, wherein each of said cross members comprises a cable supporting traction elements thereon.

3. A tire chain according to claim 2, wherein each of said traction elements comprises a helical wire sleeve surrounding the cable of the corresponding cross member.

4. A tire chain according to claim 1, wherein said cross members form a zig-zag cross member pattern.

5. A tire chain according to claim 1, wherein said cross members are substantially parallel.

6. A tire chain according to claim 1, wherein said cross members are connected to said side members by connector plates having openings in which studded ends of said cross members are received and trapped.

7. A tire chain according to claim 1, wherein said cross members are connected to one of said side members by a series of spaced connector plates, and further comprising a plurality of hooks alternating with said connector plates on said one side member, and tensioning members engageable with said hooks for drawing said hooks toward an axis of said dual tires.

8. A tire chain according to claim 1, wherein said core comprises a cable.

9. A tire chain according to claim 1, wherein said core comprises a cable wrapped helically with wire.

10. A tire chain according to claim 1, wherein an inner diameter of said spring is greater than an outer diameter of said core so that the spring is movable on the core.

11. A tire chain according to claim 1, wherein said connector parts of said center member comprise a hook at one end and an eye at the opposite end engageable with the hook.

12. A tire chain according to claim 1, wherein each of said connector parts of said center member comprises a tube crimped onto said core.

13. A tire chain according to claim 12, wherein said spring substantially covers said tubes.

14. A tire chain according to claim 1, wherein adjacent turns of said helical spring are in contact with each other.

15. A tire chain according to claim 1, wherein the length of said center member is adjustable.

16. A center member of a tire chain for dual tires, comprising an elongated core surrounded by an elongated helical spring, the core having connector parts at opposite ends thereof engageable with one another for installing the center member circumferentially in a space between dual tires.

17. A center member according to claim 16, wherein the core comprises a cable.

18. A center member according to claim 17, wherein the cable is stranded.

19. A center member according to claim 18, wherein the cable is wrapped helically with wire.

20. A center member according to claim 16, wherein each of the connector parts comprises a tube crimped to the core.

21. A center member according to claim 20, wherein the spring substantially covers the tubes when the center member is formed into a circle.

22. A center member according to claim 16, wherein adjacent turns of the spring are in contact with each other.

23. A center member according to claim 16, wherein the spring has an inner diameter greater than an outer diameter of the core so that the spring is movable on the core.

* * * * *